(12) United States Patent
Piramanayagam et al.

(10) Patent No.: US 10,244,244 B2
(45) Date of Patent: Mar. 26, 2019

(54) SCREEN-ADAPTIVE DECODING OF HIGH DYNAMIC RANGE VIDEO (71) Applicant: Dolby Laboratories Licensing Corporation, San Francisco, CA (US)

(72) Inventors: Sankaranarayanan Piramanayagam, Rochester, NY (US); Qing Song, Sunnyvale, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/795,093

(22) Filed: Oct. 26, 2017

(65) Prior Publication Data

US 2018/0115777 A1    Apr. 26, 2018

Related U.S. Application Data

(60) Provisional application No. 62/412,909, filed on Oct. 26, 2016.

(30) Foreign Application Priority Data

Oct. 26, 2016    (EP) .................................. 16195840

(51) Int. Cl.
*H04N 7/12* (2006.01)
*H04N 11/02* (2006.01)
(Continued)

(52) U.S. Cl.
CPC ........... *H04N 19/186* (2014.11); *G06T 5/007* (2013.01); *G06T 7/00* (2013.01); *G06T 9/00* (2013.01); *G09G 5/005* (2013.01); *H04N 19/182* (2014.11); *H04N 19/587* (2014.11); *H04N 19/68* (2014.11); *H04N 19/98* (2014.11); *G06T 2207/20208* (2013.01); (Continued)

(58) Field of Classification Search
CPC .................... H04N 19/98; H04N 19/68; G06T 2207/20208; G06T 5/007
See application file for complete search history.

(56) References Cited

U.S. PATENT DOCUMENTS

| 8,811,490 | B2 | 8/2014 | Su | |
| 2015/0235618 | A1* | 8/2015 | Takahashi | G09G 5/06 345/601 |
| 2016/0005153 | A1 | 1/2016 | Atkins | |
| 2016/0005349 | A1* | 1/2016 | Atkins | H04N 5/20 345/591 |
| 2016/0165256 | A1* | 6/2016 | Van Der Vleuten | H04N 9/68 375/240.01 |
| 2016/0205371 | A1* | 7/2016 | Wallace | G06T 5/007 348/571 |

(Continued)

FOREIGN PATENT DOCUMENTS

| GB | 2534929 | 8/2016 |
| WO | 2012/142471 | 10/2012 |

(Continued)

*Primary Examiner* — Rebecca A Volentine (57) ABSTRACT

Methods for screen-adaptive decoding of video with high dynamic range (HDR) are described. The methods combine the traditional compositing and display management steps into one screen-adaptive compositing step. Given decoded standard dynamic range (SDR) input data, metadata related to the prediction of output HDR data in a reference dynamic range, and the dynamic range of a target display, new output luma and chroma prediction functions are generated that map directly the input SDR data to output HDR data in the target dynamic range, thus eliminating the display management step.

16 Claims, 5 Drawing Sheets

(51) Int. Cl.
*H04N 11/04* (2006.01)
*H04N 19/186* (2014.01)
*G06T 5/00* (2006.01)
*H04N 19/68* (2014.01)
*H04N 19/182* (2014.01)
*H04N 19/587* (2014.01)
*H04N 19/98* (2014.01)
*G06T 7/00* (2017.01)
*G06T 9/00* (2006.01)
*G09G 5/00* (2006.01)

(52) U.S. Cl.
CPC ............... *G09G 2320/0673* (2013.01); *G09G 2320/0693* (2013.01); *G09G 2340/02* (2013.01); *G09G 2370/04* (2013.01)

(56) References Cited

U.S. PATENT DOCUMENTS

2016/0286226 A1 9/2016 Ridge
2016/0309154 A1* 10/2016 Rusanovskyy ...... H04N 19/159
2016/0366449 A1* 12/2016 Stessen .................... H04N 9/77
2017/0085878 A1* 3/2017 Sole Rojals ......... H04N 19/124

FOREIGN PATENT DOCUMENTS

WO 2015/175549 11/2015
WO 2017/165494 9/2017

* cited by examiner

SCREEN-ADAPTIVE DECODING OF HIGH DYNAMIC RANGE VIDEO

CROSS-REFERENCE TO RELATED APPLICATIONS

This application claims priority to U.S. Provisional Patent Application No. 62/412,909 and European Patent Application No. 16195840.0, both filed on Oct. 26, 2016, which are hereby incorporated by reference in their entireties.

TECHNOLOGY

The present invention relates generally to images. More particularly, an embodiment of the present invention relates to the screen-adaptive decoding of video signals with high dynamic range by combining in a decoder compositing and display mapping functions.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where $n \leq 8$ (e.g., color 24-bit JPEG images) are considered images of standard dynamic range, while images where $n > 8$ may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, color space or gamut information, prediction parameters, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, without limitation, the methods of the present disclosure relate to any dynamic range higher than SDR.

As used herein, the term "reshaping" refers to a pre-processing operation on an HDR image, such as scaling, quantization, and the like, to map it from its original bit depth to an image of the same or lower bit depth, to allow for more efficient coding using existing coding standards and devices. 'Forward reshaping' parameters used by an encoder may be communicated to a receiver as part of the coded bitstream using metadata so that a compliant decoder may apply an 'inverse' or 'backward reshaping' operation to reconstruct the original signal at its full dynamic range. Reshaping may be applied to any one or all of the color components of an HDR signal. In some embodiments, reshaping may also be constrained by the requirement to preserve on the decoded image the artistic intent of the original, for example, in terms of the accuracy of colors or "look," as specified by a colorist under the supervision of the director.

In an existing video post-production workflow pipeline, video content may be color-graded on a reference display that is considerably different than the display where the output video will be rendered. For example, a studio may color-grade a movie on a high-end 4,000 nits display; however, an end-user (or target) display may be only 100 nits, 200 nits, or 1,000 nits. In a typical decoder, after compositing or reconstructing the 4,000 nits HDR video in a "composer," a separate display management process may map the 4,000 nits HDR video to the high dynamic range of the target display (say, 500 nits). This process may be too computationally intensive for portable devices or other low-end display devices. To improve existing decoding schemes, as appreciated by the inventors here, improved techniques for screen-adaptive decoding of HDR content are required.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Screen-adaptive techniques for decoding high dynamic range (HDR) images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to screen-adaptive techniques for decoding HDR images. In a method for screen-adaptive decoding with a processor, in a decoder, the processor receives an input image comprising a luma component and one or more chroma components in a first dynamic range (e.g., SDR). It also receives metadata associated with the input image, wherein the metadata comprise input parameters associated with an input luma prediction function and an input chroma prediction function, wherein the input luma and chroma prediction functions map pixel values from the first dynamic range to pixel values in a second dynamic range (e.g., HDR), wherein the second dynamic range is higher than the first dynamic range. The processor receives a target dynamic range value for a target display, which is typically between the first and the second dynamic ranges. It accesses a luminance display mapping function, wherein the luminance display mapping function maps luminance pixel values in the second dynamic range to luminance pixel values in the target dynamic range. It generates an output luma prediction function based on the parameters of the input luma prediction function and the luminance display mapping function, wherein the output luma prediction function maps pixel values in a luma component from the first dynamic range to pixel values in the target dynamic range. The processor generates output parameters for an output chroma prediction function based on the target dynamic range, a parameter conversion matrix, and a saturation scaling function, wherein the output chroma prediction function maps pixel values in a chroma component from the first dynamic range to pixel values in the target dynamic range, and it generates an output image in the target dynamic range based on the input image, the output luma prediction function, and the output chroma prediction function.

Example Video Delivery Processing Pipeline

Figure 1:
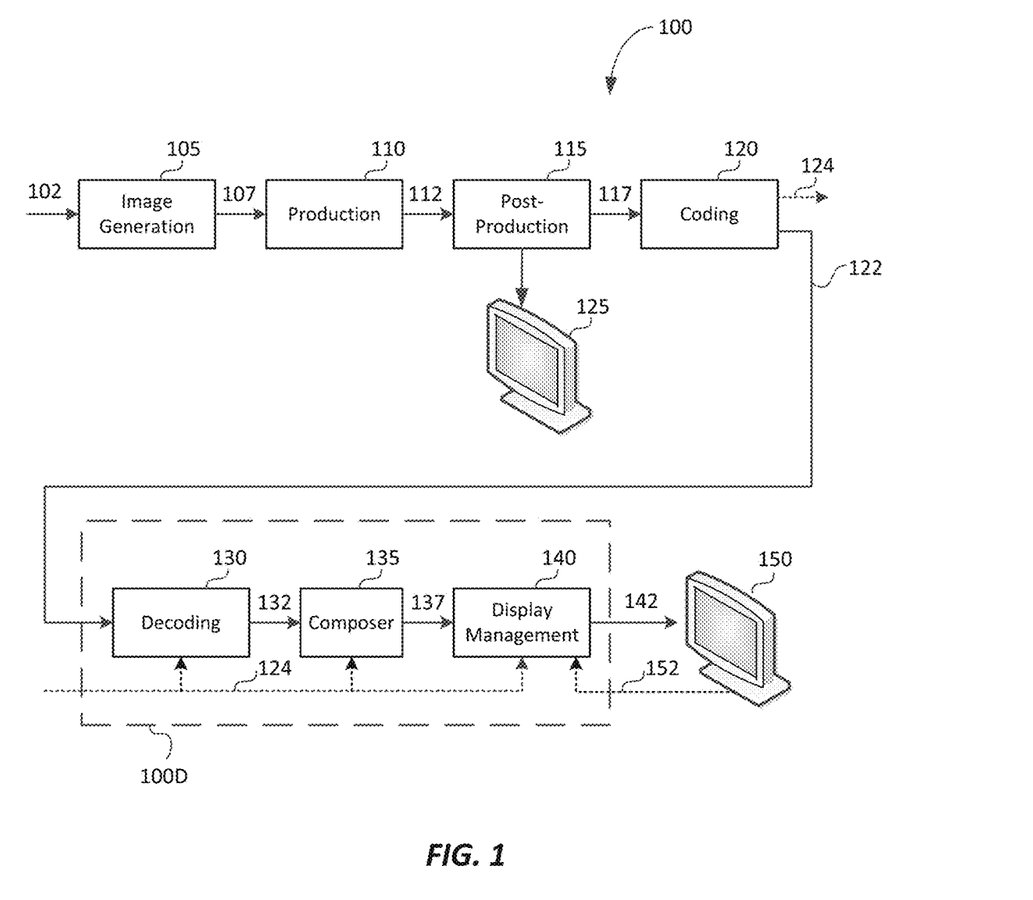
FIG. 1 depicts an example process for a video delivery pipeline.

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). Coded bitstream (122) may be represented by a single layer video coded bitstream or by a multi-layer bitstream. For example, in a multi-layer bitstream, signal (122) may include a base layer (say, an SDR layer or a 10-bit HDR (HDR10) layer) and an enhancement layer, which when combined with the base layer yields a HDR bitstream with higher dynamic range than the base layer alone (e.g., a 12-bit HDR signal). In addition to the signal (122), the output bitstream from the encoder may also include metadata (124). Metadata (124) may include prediction parameters and other data to assist a decoder to better reconstruct an HDR signal. For example, in an embodiment, metadata (124) may include parameters related to a backward reshaping function that needs to be applied to the decoded signal (e.g., 132) after decompression (e.g., 130).

In a receiver (100D), the coded bit stream (122) is decoded by decoding unit (130) to generate a decoded signal (132). Given decoded signal (132) (which may be represented by a single layer or multiple layers) and metadata (124), composer (135) generates signal (137) representing an identical or close approximation of signal (117) at either a standard dynamic range or a high dynamic range, depending on the capabilities of target (or receiver) display (150). For example, in an embodiment with a dual-layer coded signal, the composer may use metadata to derive a prediction function, generate HDR predicted data based on the base layer, and then combine the HDR predicted data with the enhancement layer to generate the output HDR signal. In an embodiment with a reshaped single layer signal, the composer may use the metadata to reconstruct a reverse (or backward) reshaping function which it can apply to the received signal (132) to generate an output HDR signal.

The target display (150) may have completely different characteristics than the reference display (125). For example, without limitation, the reference display (125) may be a 4,000 nits display while the target display may be a 500 nits display. In that case, a display management module (140), using display information (152) and data metadata (124), may be used to map the dynamic range of decoded signal (137) to the characteristics of the target display (140) by generating display-mapped signal (142). As used herein, the term "display management" denotes the processing (e.g., tone and gamut mapping) required to map an input video signal of a first dynamic range (e.g., 1000 nits) to a display of a second dynamic range (e.g., 500 nits).

Since the composer output (137) may never be viewed and serves only as an intermediate result, in devices with limited computational resources, such as mobile phones, electronic tablets, or low-end displays, it may be beneficial to reduce the computational load in the receiver and combine the composer (135) and the display-management processes (140) into a single screen-adaptive composer. An example of such an embodiment is depicted in FIG. 2.

Figure 2:
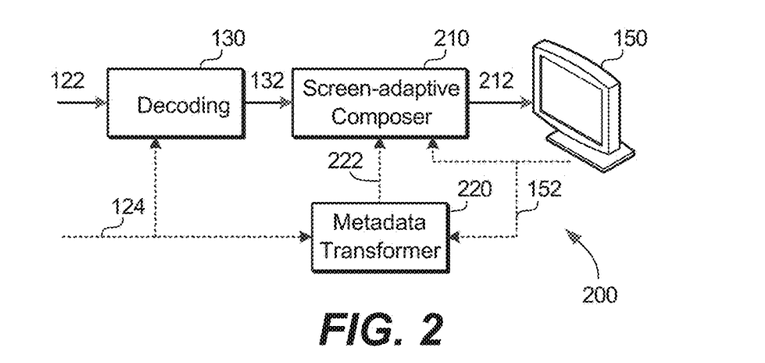
FIG. 2 depicts an example of screen-adaptive decoding of HDR video according to an embodiment of this invention.

As depicted in FIG. 2, in an embodiment, in the decoder, the original composer (135) and display management unit (140) are replaced with a computationally simpler metadata transformer (220) and a screen-adaptive composer (210). As will be described in more detail, input metadata (124) are transformed by taking into consideration the characteristics of the target display (150) to generate transformed metadata (222), which, in combination with input data (132), generate a video output (212) that is optimized for the characteristics of the target display (150).

Nomenclature

In the remaining of this specification, the following notation might be used:

$v_{ji}^y$, $v_{ji}^u$, and $v_{ji}^v$: Denote the original high dynamic range (HDR) input in the encoder (e.g., 117) in a luma (y) and chroma (u, v) representation (e.g., YCbCr), for the i-th pixel of the j-th frame. Without limitation, values may be normalized between 0 and 1. This input may be color-graded on a reference display (125) with a maximum possible dynamic range (say, 4,000 nits).

$\hat{s}_{ji}^{y,100}$, $\hat{s}_{ji}^{u,100}$, and $\hat{s}_{ji}^{v,100}$: Denote a standard dynamic range (SDR) input reconstructed at the decoder (e.g. 132) in luma (y) and chroma (u, v) representation (say, YCbCr), typically color-graded or adjusted for a targeted SDR display of a typical SDR dynamic range (e.g., 100 cd/m²). Values may be normalized between 0 and 1. In an encoder, the $\hat{s}_{ji}^{100}$ samples may be generated from the HDR input $v_{ji}$ samples using forward reshaping, tone-mapping, color-grading, and the like.

$\hat{v}_{ji}^y$, $\hat{v}_{ji}^u$, and $\hat{v}_{ji}^v$: Denote the estimated, reconstructed, HDR output from the composer (e.g., 137). Values may be normalized between 0 and 1.

$\tilde{s}_{ji}^{y,n}$, $\tilde{s}_{ji}^{u,n}$, and $\tilde{s}_{ji}^{v,n}$: Denote SDR luma and chroma values reformatted for a target display (150) with n nits of dynamic range. Values may be normalized between 0 and 1.

$\bar{s}_{ji}^{y,n}$, $\bar{s}_{ji}^{u,n}$, and $\bar{s}_{ji}^{v,n}$: Denote reference luma and chroma SDR values color graded for a display with n nits of dynamic range. Values may be normalized between 0 and 1. Ideally, for the same picture, computed $\tilde{s}_{ji}^n$ values should be as close as possible to $\bar{s}_{ji}^n$ values.

100→4k: The symbol implies a conversion from one display brightness to another; e.g. from 100 cd/m² (nits) to 4,000 cd/m² (nits).

Screen-Adaptive Composer for Luma

In a receiver (e.g., 200), after decoding (130), the following data may be available:

Decoded SDR sample data (e.g., $\hat{s}_{ji}^{100}$) (132) with luma and chroma characteristics optimized for a reference SDR display (say, at 100 nits).

Input metadata (124) related to:
the characteristics of the input reference HDR display (e.g., 125);
the luminance characteristics of the input data (e.g., their min, max, and average or med brightness values for each frame or for a scene);
a luma prediction or backward reshaping function (denoted by $g_{LB}(\ )$) or an associated Look-up table ($LUT_{LB}$), which when applied to the decoded SDR data can generate HDR data at the reference high dynamic range (say, 4,000 nits). For example, in some embodiments the $g_{LB}(\ )$ function may be transmitted to the decoder as a piece-wise polynomial using linear or second-order polynomial segments.
Metadata related to the prediction of HDR and wide color gamut chroma pixel values from the corresponding SDR luma and/or chroma pixel values.

Metadata (152) for the receiver display (150) characterizing the receiver display (e.g., the display's lowest, average and highest brightness value).

In addition, receiver (200) may also have access to a luma display management (DM) function (denoted by $g_{LD}(\ )$ or $LUT_{LD}$) mapping input values from the reference high dynamic range (say, 4,000 nits) to the target dynamic range (say, 400 nits).

In some embodiments, the decoded SDR to reference DR HDR mapping function $g_{LB}(\ )$ may be defined only for pixel values within a valid SMPTE range (e.g., 16 to 235), to be denoted as $g_B(\ )$, while the DM function may be defined for the full range. In such a scenario, in an embodiment, the normalized SMPTE range (e.g., 16/255 to 235/255 for 8-bit data) may be rescaled to the full (0,1) range using simple rescaling, such as:

$$g_{LB}(x)=(g_B(x)-16/256)*(256/(235-16)) \quad (1)$$

Given all this information, the objective of the screen-adaptive composer (210) is to generate a new mapping function (denoted by $g_{LF}(\ )$) mapping luminance SDR values to output HDR values at the target display dynamic range. In an embodiment, such a mapping function may be generated as:

$$g_{LF}(x)=g_{LD}(g_{LB}(x)), \text{ for } x \text{ in } (0,1). \quad (2)$$

In practice, the goal is to generate a look-up table, denoted as $LUT_{LF}(Y)$, which maps decoded SDR luminance values to HDR luminance values for the target display. Let bsdr (e.g., bsdr=10) denote the SDR bit-depth. To compute $LUT_{LF}(Y)$, one may pass all possible ($2^{bsdr}$) SDR values to the $g_{LB}(\ )$ function and the $g_{LD}(\ )$ functions; however, such a mapping may be very computational intensive. Alternatively, one may generate $LUT_{LF}(Y)$ only for a subset of the input values and then use simple interpolation between $LUT_{LF}$ values. In embodiments where $g_{LB}(\ )$ is defined through a piece-wise polynomial, to reduce number of computations, a set of $LUT_{LF}$ values may be computed only at the pivot points (that is, at the boundary points of each segment) (e.g., 9 points for an 8-pieces piecewise polynomial). Then, the remaining values can be generated by a simple linear interpolation.

Figure 3:
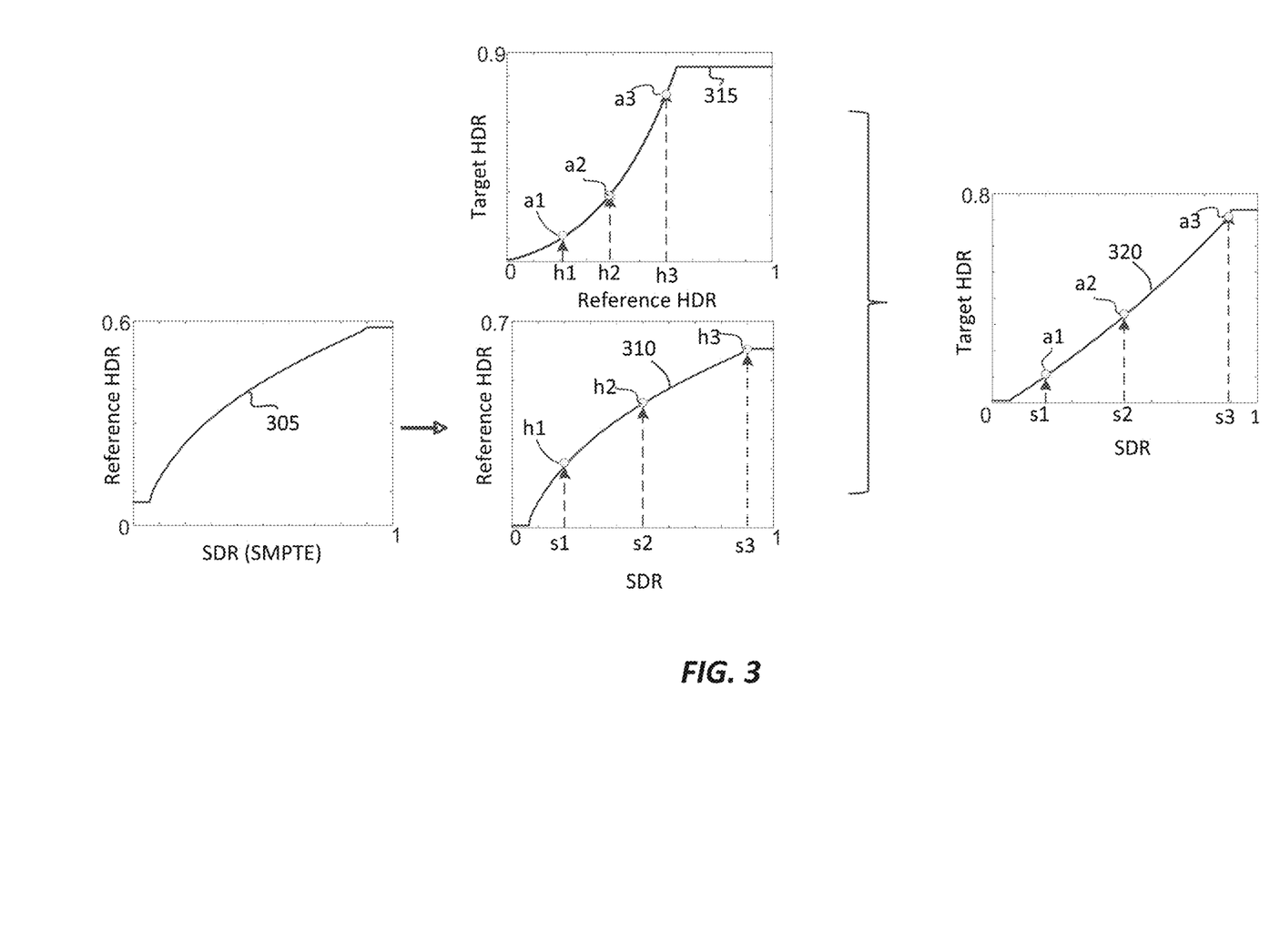
FIG. 3 depicts an example of screen-adaptive mapping for the luma component according to an embodiment of this invention.

FIG. 3 depicts an example of a screen-adaptive compositing (or mapping) function for the luma component according to an embodiment. Function (305) depicts an example of a $g_B()$ mapping, mapping SDR values (in a SMPTE range) to reference HDR values. Following the rescaling of $g_B()$ e.g., using equation (1), function (310) depicts the corresponding $g_{LB}()$ function in the full (0,1) range. For k selected points, preferably, but without limitation, the pivot points in (310) (e.g., s1, s2, s3), a) one computes $$hi = g_{LB}(si), \text{ for } i=1,2,\ldots,k,$$

b) then, one computes $$ai = g_{LD}(hi), \text{ for } i=1,2,\ldots,k,$$

and finally, one maps the input si points to the output ai values to generate $g_{LF}(si)$ sample values according to equation (2), mapping input SDR values to target HDR values. Given the $g_{LF}(si)$ sample values, one may use linear or non-linear interpolation to generate the final $g_{LF}()$ (or $LUT_{LF}$) mapping function (320).

Screen-Adaptive Composer for Chroma

In an embodiment, in the decoder, generating the chroma components of the HDR output using the decoded SDR input may be based on a multivariate, multiple regression (MMR) representation. As first discussed in U.S. Pat. No. 8,811,490, "Multiple color channel multiple regression predictor," by G-M. Su, et al., MMR-based prediction allows one color component (say Cb) of the HDR output to be predicted based on a combination of all the other color components (e.g., Y, Cb, and Cr) in the SDR input. For example, in an embodiment, using a second order with cross-products MMR representation, where the HDR u or v chroma component is modeled as a function of SDR y, u, or v values $$v_{ji}^{u,4k} = m_{j,0}^{u,100 \to 4k} + m_{j,1}^{u,100 \to 4k} s_{ji}^{y,100} + m_{j,2}^{u,100 \to 4k}(s_{ji}^{y,100})^2 + m_{j,3}^{u,100 \to 4k}(s_{ji}^{y,100})^3 + m_{j,4}^{u,100 \to 4k}(s_{ji}^{u,100}) + m_{j,5}^{u,100 \to 4k}(s_{ji}^{u,100})^2 + m_{j,6}^{u,100 \to 4k}(s_{ji}^{u,100})^3 + m_{j,7}^{u,100 \to 4k}(s_{ji}^{v,100}) + m_{j,8}^{u,100 \to 4k}(s_{ji}^{v,100})^2 + m_{j,9}^{u,100 \to 4k}(s_{ji}^{v,100})^3, \quad (3a)$$

$$v_{ji}^{v,4k} = m_{j,0}^{v,100 \to 4k} + m_{j,1}^{v,100 \to 4k} s_{ji}^{y,100} + m_{j,2}^{v,100 \to 4k}(s_{ji}^{y,100})^2 + m_{j,3}^{v,100 \to 4k}(s_{ji}^{y,100})^3 + m_{j,4}^{v,100 \to 4k}(s_{ji}^{u,100}) + m_{j,5}^{v,100 \to 4k}(s_{ji}^{u,100})^2 + m_{j,6}^{v,100 \to 4k}(s_{ji}^{u,100})^3 + m_{j,7}^{v,100 \to 4k}(s_{ji}^{v,100}) + m_{j,8}^{v,100 \to 4k}(s_{ji}^{v,100})^2 + m_{j,9}^{v,100 \to 4k}(s_{ji}^{v,100})^3, \quad (3b)$$

where $m_{j,k}^{u,100 \to 4k}$ and $m_{j,k}^{v,100 \to 4k}$, for $k=0, 1, \ldots, 9$, represent the MMR polynomial coefficients which are transmitted as part of the bitstream (e.g., as metadata) from the encoder to the decoder.

Similarly, a third-order with cross-products MMR prediction polynomial, where each HDR chroma component is modeled as a function of SDR y, u, and v values and may be expressed as:

$$v_{ji}^{u,4k} = m_{j,0}^{u,100 \to 4k} + m_{j,1}^{u,100 \to 4k} s_{ji}^{y,100} + m_{j,2}^{u,100 \to 4k} s_{ji}^{y,100} + m_{j,3}^{u,100 \to 4k} s_{ji}^{v,100} + m_{j,4}^{u,100 \to 4k} s_{ji}^{y,100} s_{ji}^{u,100} + m_{j,5}^{u,100 \to 4k} s_{ji}^{y,100} s_{ji}^{v,100} + m_{j,6}^{u,100 \to 4k} s_{ji}^{u,100} s_{ji}^{v,100} + m_{j,7}^{u,100 \to 4k} s_{ji}^{y,100} s_{ji}^{u,100} s_{ji}^{v,100} + m_{j,8}^{u,100 \to 4k}(s_{ji}^{y,100})^2 + m_{j,9}^{u,100 \to 4k}(s_{ji}^{u,100})^2 + m_{j,10}^{u,100 \to 4k}(s_{ji}^{v,100})^2 + m_{j,11}^{u,100 \to 4k}(s_{ji}^{y,100})^2 s_{ji}^{u,100} + m_{j,12}^{u,100 \to 4k}(s_{ji}^{y,100})^2 s_{ji}^{v,100} + m_{j,13}^{u,100 \to 4k}(s_{ji}^{u,100})^2 s_{ji}^{v,100} + m_{j,14}^{u,100 \to 4k}(s_{ji}^{y,100})^2 s_{ji}^{u,100} s_{ji}^{v,100} + m_{j,15}^{u,100 \to 4k}(s_{ji}^{y,100})^3 + m_{j,16}^{u,100 \to 4k}(s_{ji}^{u,100})^3 + m_{j,17}^{u,100 \to 4k}(s_{ji}^{v,100})^3 + m_{j,18}^{u,100 \to 4k}(s_{ji}^{y,100})^3 s_{ji}^{u,100} + m_{j,19}^{u,100 \to 4k}(s_{ji}^{y,100})^3 s_{ji}^{v,100} + m_{j,20}^{u,100 \to 4k}(s_{ji}^{u,100})^3 s_{ji}^{v,100} + m_{j,21}^{u,100 \to 4k}(s_{ji}^{y,100})^3 s_{ji}^{u,100} s_{ji}^{v,100})^3 \quad (4a)$$

$$v_{ji}^{v,4k} = m_{j,0}^{v,100 \to 4k} + m_{j,1}^{v,100 \to 4k} s_{ji}^{y,100} + m_{j,2}^{v,100 \to 4k} s_{ji}^{u,100} + m_{j,3}^{v,100 \to 4k} s_{ji}^{v,100} + m_{j,4}^{v,100 \to 4k} s_{ji}^{y,100} s_{ji}^{u,100} + m_{j,5}^{v,100 \to 4k} s_{ji}^{y,100} s_{ji}^{v,100} + m_{j,6}^{v,100 \to 4k} s_{ji}^{u,100} s_{ji}^{v,100} + m_{j,7}^{v,100 \to 4k} s_{ji}^{y,100} s_{ji}^{u,100} s_{ji}^{v,100} + m_{j,8}^{v,100 \to 4k}(s_{ji}^{y,100})^2 + m_{j,9}^{v,100 \to 4k}(s_{ji}^{u,100})^2 + m_{j,10}^{v,100 \to 4k}(s_{ji}^{v,100})^2 + m_{j,11}^{v,100 \to 4k}(s_{ji}^{y,100})^2 s_{ji}^{u,100} + m_{j,12}^{v,100 \to 4k}(s_{ji}^{y,100})^2 s_{ji}^{v,100} + m_{j,13}^{v,100 \to 4k}(s_{ji}^{u,100})^2 s_{ji}^{v,100} + m_{j,14}^{v,100 \to 4k}(s_{ji}^{y,100})^2 s_{ji}^{u,100} s_{ji}^{v,100} + m_{j,15}^{v,100 \to 4k}(s_{ji}^{y,100})^3 + m_{j,16}^{v,100 \to 4k}(s_{ji}^{u,100})^3 + m_{j,17}^{v,100 \to 4k}(s_{ji}^{v,100})^3 + m_{j,18}^{v,100 \to 4k}(s_{ji}^{y,100})^3 s_{ji}^{u,100} + m_{j,19}^{v,100 \to 4k}(s_{ji}^{y,100})^3 s_{ji}^{v,100} + m_{j,20}^{v,100 \to 4k}(s_{ji}^{u,100})^3 s_{ji}^{v,100} + m_{j,21}^{v,100 \to 4k}(s_{ji}^{y,100})^3 s_{ji}^{u,100} s_{ji}^{v,100})^3 \quad (4b)$$

In equations (3) and (4), i represents a pixel index value, j represents a frame index value, y denotes luma (e.g., Y) and u, and v denote chroma (e.g., Cb, Cr). $m_{j,k}^{u,100 \to 4k}$ denotes the k-th MMR coefficient to convert reference SDR values (e.g., at 100 nits) to reference HDR (e.g., at 4k nits). While the values 100 and 4k are quite common when grading HDR content, here they are given without limitation, simply as notation examples. Typically, the MMR coefficients are generated at the encoder for each frame or scene of the video by some optimization techniques, such as least square minimization between the input HDR values and predicted HDR values using a reference SDR stream. The coefficients are then transmitted as a metadata alongside with the SDR image. At the decoder, these coefficients are used to convert SDR chroma to HDR chroma. Note that the number of coefficients depends on the order of luma and chroma being used. As an example and without limitation, for the two channel MMR scheme, the chroma channel has 10 MMR coefficients for the Cb channel and 10 MMR coefficients for the Cr channel (e.g., see equation (3)). For the three channel MMR model, 22 MMR coefficients are being used (e.g., see equation 4)). In the rest of this discussion, embodiments will use the two-channel MMR model; however, the methods described here can easily be adapted to the three-channel MMR model or any other linear or non-linear prediction model.

Let $m_j^{u,100 \to 4k}$, $m_j^{v,100 \to 4k}$ be vectors representing the MMR coefficients that convert chroma SDR to chroma (Cb, Cr) HDR, that is, for a two-channel MMR model, $$m_j^{u,100 \to 4k} = \begin{bmatrix} m_{j,0}^{u,100 \to 4k} \\ m_{j,1}^{u,100 \to 4k} \\ m_{j,2}^{u,100 \to 4k} \\ \vdots \\ m_{j,9}^{u,100 \to 4k} \end{bmatrix} \quad m_j^{v,100 \to 4k} = \begin{bmatrix} m_{j,0}^{v,100 \to 4k} \\ m_{j,1}^{v,100 \to 4k} \\ m_{j,2}^{v,100 \to 4k} \\ \vdots \\ m_{j,9}^{v,100 \to 4k} \end{bmatrix}. \quad (5)$$

Let $p_{ji}^{u,100}$, $p_{ji}^{v,100}$ denote vectors with elements corresponding to the SDR pixel values for each pixel i in the j frame, then for the two-channel MMR model $$p_{ji}^{u,100} = [1 \; \hat{s}_{ji}^{y,100} \; \hat{s}_{ji}^{u,100} \; \hat{s}_{ji}^{v,100} \; \hat{s}_{ji}^{y,100} \hat{s}_{ji}^{u,100} (\hat{s}_{ji}^{y,100})^2 (\hat{s}_{ji}^{y,100})^2 (\hat{s}_{ji}^{u,100})^2 (\hat{s}_{ji}^{v,100})^2 (\hat{s}_{ji}^{y,100})^3 (\hat{s}_{ji}^{u,100})^3 (\hat{s}_{ji}^{v,100})^3]$$

$$p_{ji}^{v,100} = [1 \; \hat{s}_{ji}^{y,100} \; \hat{s}_{ji}^{u,100} \; \hat{s}_{ji}^{v,100} \; \hat{s}_{ji}^{y,100} \hat{s}_{ji}^{u,100} (\hat{s}_{ji}^{y,100})^2 (\hat{s}_{ji}^{y,100})^2 (\hat{s}_{ji}^{u,100})^2 (\hat{s}_{ji}^{v,100})^2 (\hat{s}_{ji}^{y,100})^3 (\hat{s}_{ji}^{u,100})^3 (\hat{s}_{ji}^{v,100})^3], \quad (6)$$

and, using a vector notation, equations (3a) and (3b) may be expressed as $$\hat{v}_{ji}^{u,4k} = p_{ji}^{u,100} m_j^{u,100 \to 4k}, \qquad (7a)$$

$$\hat{v}_{ji}^{v,4k} = p_{ji}^{v,100} m_j^{v,100 \to 4k}. \qquad (7b)$$

Equation (7) assumes that the target (receiver) display (150) matches the characteristics of the reference display (125) (e.g., it has a dynamic range of 4,000 nits). If that is not the case, as recognized by the inventors, the SDR to HDR mapping needs to be adjusted by a scale factor (also to be referred as a saturation scaling factor). This is done to increase the saturation of the output image and improve its overall video quality. From subjective testing, the inventors found that a saturation scaling factor which can be expressed as function of the luma, or as a function of both luma and chroma, works best. Details related to the derivation of the scaling factor are presented in a later section. Note that, in its most general form, the scaling factor can be any polynomial function of the SDR and/or HDR channels. As an example, MMR conversion is described herein for a saturation scaling factor which is a polynomial function of the luma and chroma components. Each chroma component may have its own saturation scaling function, for example, if denoted as $f^{u,n}(\hat{s}_{ji}^{y,100}, \hat{s}_{ji}^{u,100})$ and $f^{v,n}(\hat{s}_{ji}^{y,100}, \hat{s}_{ji}^{v,100})$, then $$\tilde{s}_{ji}^{u,n} = f^{u,n}(\hat{s}_{ji}^{y,100}, \hat{s}_{ji}^{u,100}) \cdot (\hat{v}_{ji}^{u} - 0.5) + 0.5, \qquad (8a)$$

$$\tilde{s}_{ji}^{v,n} = f^{v,n}(\hat{s}_{ji}^{y,100}, \hat{s}_{ji}^{v,100}) \cdot (\hat{v}_{ji}^{v} - 0.5) + 0.5. \qquad (8b)$$

In an embodiment, the $f^{u,n}$ function may be modeled by a second-order polynomial function. Moving forward, derivations are shown only for the u chroma channel (e.g., Cb); however, a similar approach can be used for the second chroma channel (e.g., v or Cr) as well.
Let $$f^{u,n} = a_0^{4k \to n} + a_1^{4k \to n} \cdot \hat{s}_{ji}^{y,100} + a_2^{4k \to n} \cdot \hat{s}_{ji}^{u,100} + a_3^{4k \to n} \cdot \hat{s}_{ji}^{y,100} \hat{s}_{ji}^{u,100} + a_4^{4k \to n} \cdot (\hat{s}_{ji}^{y,100})^2 + a_5^{4k \to n} \cdot (\hat{s}_{ji}^{u,100})^2, \qquad (9)$$

where $a_k^{4k \to n}$, k=0 to 5, denote the parameters of the saturation scaling function. Substituting equations (9) and (7a) into equation (8a), yields $$\tilde{s}_{ji}^{u,n} = f^{u,n}(\hat{s}_{ji}^{y,100}, \hat{s}_{ji}^{u,100}) \cdot (p_{ji}^{u,100} \cdot m_j^{u,100 \to 4k} - 0.5) + 0.5,$$

which, after expansion and re-grouping, can be represented as $$\tilde{s}_{ji}^{u,n} = q_{ji}^{u} \cdot c_j^{u,n}, \qquad (10)$$

where the vector $q_{ji}^{u}$ contains all the luma and chroma terms, and $c_j^{u,n}$ contains the polynomial and MMR coefficients:

$$q_{ji}^{u} = [1 \; \hat{s}_{ji}^{y,100} \; (\hat{s}_{ji}^{y,100})^2 \; (\hat{s}_{ji}^{y,100})^3 \; (\hat{s}_{ji}^{y,100})^4 \; (\hat{s}_{ji}^{y,100})^5 \qquad (11a)$$
$$\hat{s}_{ji}^{u,100} \; \hat{s}_{ji}^{y,100} \cdot \hat{s}_{ji}^{u,100} \; (\hat{s}_{ji}^{y,100})^2 \cdot \hat{s}_{ji}^{u,100} \; (\hat{s}_{ji}^{y,100})^3 \cdot \hat{s}_{ji}^{u,100}$$
$$(\hat{s}_{ji}^{y,100})^4 \cdot \hat{s}_{ji}^{u,100} \; (\hat{s}_{ji}^{u,100})^2 \; \hat{s}_{ji}^{y,100} \cdot (\hat{s}_{ji}^{u,100})^2 \; (\hat{s}_{ji}^{y,100})^2 \cdot (\hat{s}_{ji}^{u,100})^2$$
$$(\hat{s}_{ji}^{y,100})^3 \cdot (\hat{s}_{ji}^{u,100})^2 \; (\hat{s}_{ji}^{y,100})^4 \cdot (\hat{s}_{ji}^{u,100})^2 \; (\hat{s}_{ji}^{y,100})^5 \cdot (\hat{s}_{ji}^{u,100})^3$$
$$(\hat{s}_{ji}^{y,100})^2 \cdot (\hat{s}_{ji}^{u,100})^3 \; (\hat{s}_{ji}^{y,100})^3 \cdot (\hat{s}_{ji}^{u,100})^3 \; (\hat{s}_{ji}^{y,100})^4 \cdot (\hat{s}_{ji}^{u,100})^3$$
$$(\hat{s}_{ji}^{y,100})^5 \cdot (\hat{s}_{ji}^{u,100})^3 \; (\hat{s}_{ji}^{u,100})^4 \; \hat{s}_{ji}^{y,100} \cdot (\hat{s}_{ji}^{u,100})^4 \; (\hat{s}_{ji}^{y,100})^2 \cdot (\hat{s}_{ji}^{u,100})^4$$
$$(\hat{s}_{ji}^{y,100})^3 \cdot (\hat{s}_{ji}^{u,100})^4 \; (\hat{s}_{ji}^{y,100})^4 \cdot (\hat{s}_{ji}^{u,100})^4 \; (\hat{s}_{ji}^{u,100})^5 \; (\hat{s}_{ji}^{y,100})^3 \cdot (\hat{s}_{ji}^{u,100})^5]$$

$$c_j^{u,n} = \begin{bmatrix} a_0 \cdot m_0 - a_0/2 + 1/2 \\ a_0 \cdot m_1 - a_1/2 + a_1 \cdot m_0 \\ a_1 \cdot m_1 - a_4/2 + a_0 \cdot m_4 + a_4 \cdot m_0 \\ a_1 \cdot m_4 + a_4 \cdot m_1 + a_0 \cdot m_7 \\ a_1 \cdot m_7 + a_4 \cdot m_4 \\ a_4 \cdot m_7 \\ a_0 \cdot m_2 - a_2/2 + a_2 \cdot m_0 \\ a_0 \cdot m_3 - a_3/2 + a_1 \cdot m_2 + a_2 \cdot m_1 + a_3 \cdot m_0 \\ a_1 \cdot m_3 + a_3 \cdot m_1 + a_2 \cdot m_4 + a_4 \cdot m_2 \\ a_3 \cdot m_4 + a_4 \cdot m_3 + a_2 \cdot m_7 \\ a_3 \cdot m_7 \\ a_2 \cdot m_2 - a_5/2 + a_0 \cdot m_5 + a_5 \cdot m_0 \\ a_2 \cdot m_3 + a_3 \cdot m_2 + a_1 * m_5 + a_5 \cdot m_1 \\ a_0 \cdot m_6 + a_3 \cdot m_3 + a_4 * m_5 + a_5 \cdot m_4 \\ a_1 \cdot m_6 + a_5 \cdot m_7 \\ a_4 \cdot m_6 \\ a_2 \cdot m_5 + a_5 \cdot m_2 + a_0 \cdot m_8 \\ a_3 \cdot m_5 + a_5 \cdot m_3 + a_1 \cdot m_8 \\ a_2 \cdot m_6 + a_4 \cdot m_8 \\ a_0 \cdot m_9 + a_3 \cdot m_6 \\ a_1 \cdot m_9 \\ a_4 \cdot m_9 \\ a_2 \cdot m_8 + a_5 \cdot m_5 \\ a_3 \cdot m_8 \\ a_5 \cdot m_6 \\ a_2 \cdot m_9 \\ a_3 \cdot m_9 \\ a_5 \cdot m_8 \\ a_5 \cdot m_9 \end{bmatrix}, \qquad (11b)$$

where, for simplicity, superscripts in the MMR coefficients are not shown.

The term $c_j^{u,n}$ can be represented as a multiplication of a matrix that contains the scaling polynomial coefficients and the MMR vectors as shown below:

$$c_j^{u,n} = A^{4000 \to n} \cdot \begin{bmatrix} 1 \\ m_j^{u,100 \to 4k} \end{bmatrix}, \qquad (12)$$

where the symbol $4000 \to n$ denotes a mapping of predicted HDR output values from the reference dynamic range (e.g., 4000 nits) to the dynamic range of the target display (e.g., n), and the matrix $A^{4000 \to n}$ is based on the polynomial coefficients (e.g., $a_0, a_1, \ldots, a_5$) for the saturation scaling function $f^{u,n}(\hat{s}_{ji}^{y,100}, \hat{s}_{ji}^{u,100})$; for example, $$A^{4000 \to n} = \begin{bmatrix} 0.5-0.5a_0 & a_0 & 0 & 0 & 0 & 0 & 0 & 0 & 0 & 0 & 0 \\ -0.5a_1 & a_1 & a_0 & 0 & 0 & 0 & 0 & 0 & 0 & 0 & 0 \\ -0.5a_4 & a_4 & a_0 & 0 & 0 & a_0 & 0 & 0 & 0 & 0 & 0 \\ 0 & 0 & a_4 & 0 & 0 & a_1 & 0 & 0 & a_0 & 0 & 0 \\ 0 & 0 & 0 & 0 & 0 & a_4 & 0 & 0 & a_1 & 0 & 0 \\ 0 & 0 & 0 & 0 & 0 & 0 & 0 & 0 & a_4 & 0 & 0 \\ -0.5a_2 & a_2 & 0 & a_0 & 0 & 0 & 0 & 0 & 0 & 0 & 0 \\ -0.5a_3 & a_3 & a_2 & 0 & a_0 & 0 & 0 & 0 & 0 & 0 & 0 \\ 0 & 0 & a_3 & a_4 & a_1 & a_2 & 0 & 0 & 0 & 0 & 0 \\ 0 & 0 & 0 & 0 & a_4 & a_3 & 0 & 0 & a_2 & 0 & 0 \\ 0 & 0 & 0 & 0 & 0 & 0 & 0 & 0 & a_3 & 0 & 0 \\ -0.5a_5 & a_5 & 0 & a_2 & 0 & 0 & a_0 & 0 & 0 & 0 & 0 \\ 0 & 0 & a_5 & a_3 & a_2 & 0 & a_1 & 0 & 0 & 0 & 0 \\ 0 & 0 & 0 & 0 & a_3 & a_5 & a_4 & a_0 & 0 & 0 & 0 \\ 0 & 0 & 0 & 0 & 0 & 0 & 0 & a_1 & a_5 & 0 & 0 \\ 0 & 0 & 0 & 0 & 0 & 0 & 0 & a_4 & 0 & 0 & 0 \\ 0 & 0 & 0 & a_5 & 0 & a_2 & 0 & 0 & a_0 & 0 & 0 \\ 0 & 0 & 0 & 0 & a_5 & 0 & a_3 & 0 & 0 & a_1 & 0 \\ 0 & 0 & 0 & 0 & 0 & 0 & a_2 & 0 & a_4 & 0 & 0 \\ 0 & 0 & 0 & 0 & 0 & 0 & a_3 & 0 & 0 & a_0 & 0 \\ 0 & 0 & 0 & 0 & 0 & 0 & 0 & 0 & 0 & a_1 & 0 \\ 0 & 0 & 0 & 0 & 0 & 0 & 0 & 0 & 0 & a_4 & 0 \\ 0 & 0 & 0 & 0 & 0 & a_5 & 0 & a_2 & 0 & 0 & 0 \\ 0 & 0 & 0 & 0 & 0 & 0 & 0 & 0 & 0 & a_3 & 0 \\ 0 & 0 & 0 & 0 & 0 & 0 & a_5 & 0 & 0 & 0 & 0 \\ 0 & 0 & 0 & 0 & 0 & 0 & 0 & 0 & 0 & a_2 & 0 \\ 0 & 0 & 0 & 0 & 0 & 0 & 0 & 0 & 0 & a_3 & 0 \\ 0 & 0 & 0 & 0 & 0 & 0 & 0 & 0 & 0 & a_5 & 0 \\ 0 & 0 & 0 & 0 & 0 & 0 & 0 & 0 & 0 & 0 & a_5 \end{bmatrix} \quad (13)$$

Substituting equation (12) into equation (10), the chroma value at pixel i of frame j becomes $$\tilde{s}_{ji}^{u,n} = q_{ji}^u \cdot A^{4000 \to n} \cdot \begin{bmatrix} 1 \\ m_j^{u,100 \to 4k} \end{bmatrix}. \quad (14)$$

Now, let $Q_j^u$ represent a matrix with each row consisting of SDR terms for each pixel $(0, 1, 2, \ldots, d-1)$ in frame j, and let $\tilde{S}_j^{u,n}$ represent a vector with all the SDR chroma value in the j-th frame, then the above equation transforms to $$\tilde{S}_j^{u,n} = Q_j^u \cdot A^{4000 \to n} \cdot \begin{bmatrix} 1 \\ m_j^{u,100 \to 4k} \end{bmatrix}, \quad (15)$$

where $$Q_j^u = \begin{bmatrix} q_{j0}^{u,100} \\ \vdots \\ q_{j(d-1)}^{u,100} \end{bmatrix}, \quad \tilde{S}_j^{u,n} = \begin{bmatrix} \tilde{s}_{j0}^{u,n} \\ \vdots \\ \tilde{s}_{j(d-1)}^{u,n} \end{bmatrix},$$

where d denotes the total number of pixels in frame j.

Note that the target chroma values could have been obtained directly from the decoded SDR value if there were available MMR coefficients $m_j^{uy,100 \to n}$ that convert from the reference SDR dynamic range (e.g., 100 cd/m²) to the target brightness (e.g., n). In that scenario, the chroma values would have be obtained by simply multiplying the decoded SDR terms with these coefficients; or $$\tilde{s}_{ji}^{u,n} = p_{ji}^{u,100} \cdot m_j^{u,100 \to n}. \quad (16)$$

Representing the above equation for all pixels, equation (16) becomes:

$$\tilde{S}_j^{u,n} = P_j^u \cdot m_j^{u,100 \to n}, \quad (17)$$

where $$P_j^u = \begin{bmatrix} p_{j0}^{u,100} \\ \vdots \\ p_{j(d-1)}^{u,100} \end{bmatrix}.$$

Equating equations (15) and (17), yields $$P_j^u \cdot m_j^{u,100 \to n} = Q_j^u \cdot A^{4000 \to n} \cdot \begin{bmatrix} 1 \\ m_j^{u,100 \to 4k} \end{bmatrix}. \quad (18)$$

From equation (18), the desired MMR coefficients, $m_j^{u,100 \to n}$ can obtained by multiplying the pseudo-inverse of $P_j^u$ with the left-hand-side of equation (18), or $$m_j^{u,100 \to n} = ((P_j^u)^T P_j^u)^{-1} \cdot ((P_j^u)^T Q_j^u) \cdot A^{4000 \to n} \cdot \begin{bmatrix} 1 \\ m_j^{u,100 \to 4k} \end{bmatrix}. \quad (19)$$

In an embodiment, since computing the inverse for each frame is computationally intensive and may not be feasible in platforms with limited computational resources (such as mobile devices), one can generate the term $((P_j^u)^T P_j^u)^{-1} * ((P_j^u)^T Q_j^u)$ in equation (19) through an approximation. For example, in an embodiment one may acquire a training set of representative images. Given that set of images, one may generate the following $P_1$, $P_2$ data, and an approximation of P. Note that approximation is with respect to the data (here: SDR luma, chroma values).

$$P_1 = \sum_j ((P_j^u)^T P_j^u), \quad (20)$$

$$P_2 = \sum_j ((P_j^u)^T Q_j^u),$$

$$P = P_1^{-1} \cdot P_2.$$

From equation (20), equation (19) may be simplified as $$m_j^{u,100 \to n} = P \cdot A^{4000 \to n} \cdot \begin{bmatrix} 1 \\ m_j^{u,100 \to 4k} \end{bmatrix}, \quad (21)$$

where, for a given set of training images, the matrix P is the same for all resolutions of the target display. Let $T^{4000 \to n} = P \cdot A^{4000 \to n}$ be denoted as an MMR coefficient conversion matrix, then $$m_j^{u,100\rightarrow n} = T^{4000\rightarrow n} \cdot \begin{bmatrix} 1 \\ m_j^{u,100\rightarrow 4k} \end{bmatrix}. \quad (22a)$$

Given the conversion matrix ($T^{4000\rightarrow n}$) and the original MMR coefficients ($m_j^{u,100\rightarrow 4k}$), a decoder may generate updated transform MMR coefficients ($m_j^{u,100\rightarrow n}$) and generate directly the output HDR chroma components for the dynamic range of the target display.

Following the same procedure as before, a similar conversion matrix may also be generated for the second (v) color component, or $$m_j^{v,100\rightarrow n} = T^{4000\rightarrow n} \cdot \begin{bmatrix} 1 \\ m_j^{v,100\rightarrow 4k} \end{bmatrix}. \quad (22b)$$

Given the transformed MMR coefficients (e.g., 222), then, from equation (7), in the screen-adaptive composer (210), the chroma components of the output (212) may be computed as $$\hat{v}_{ji}^{u,n} = p_{ji}^{u,100} m_j^{u,100\rightarrow n}, \quad (23a)$$

$$\hat{v}_{ji}^{v,n} = p_{ji}^{v,100} m_j^{v,100\rightarrow n}. \quad (23b)$$

Designing the Saturation Scaling Function

Figure 4A:
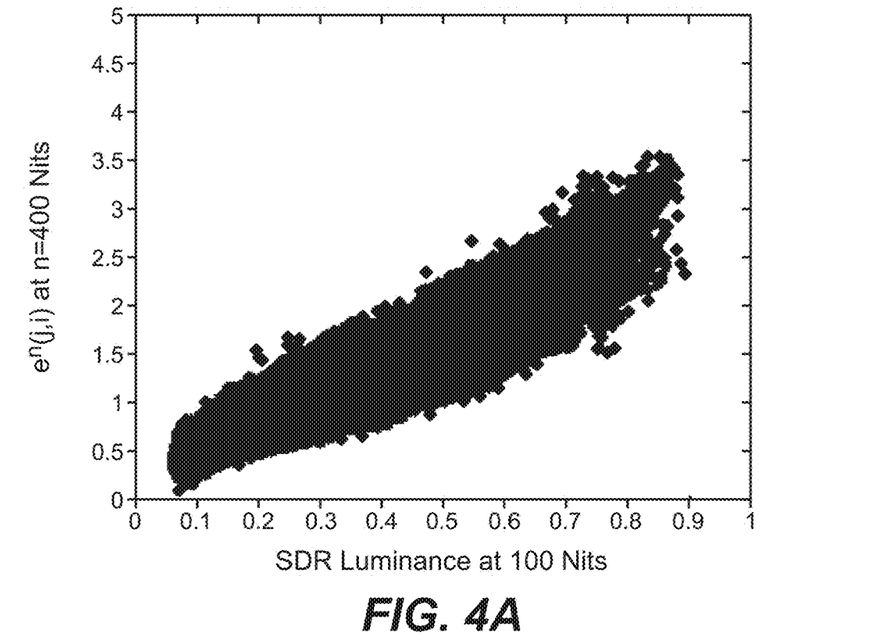
FIG. 4A depicts an example of energy ratio values versus luma values computed according to an embodiment of this invention.
Figure 4B:
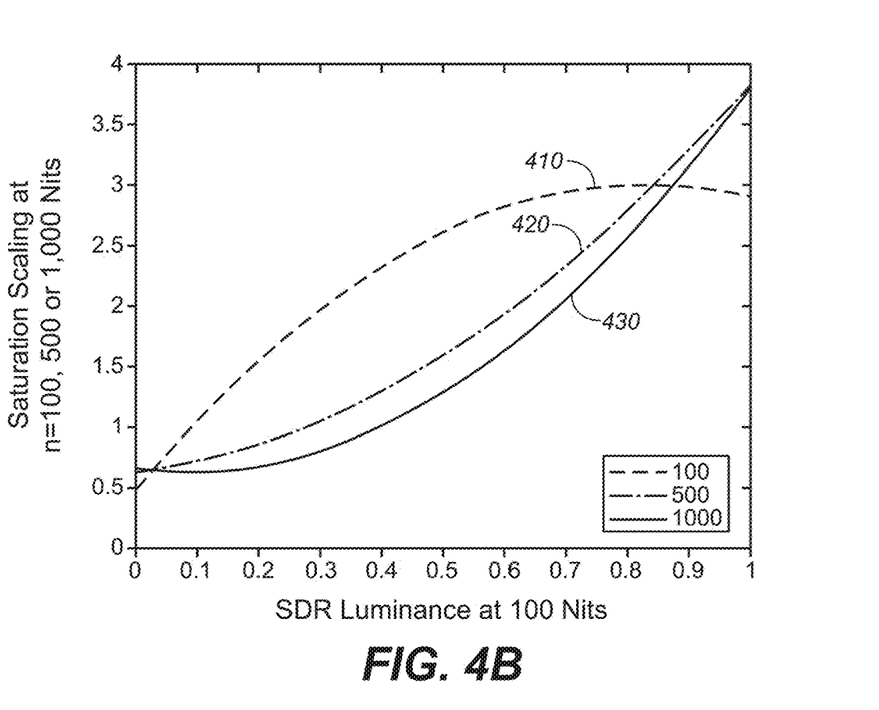
FIG. 4B depicts examples of saturation scaling functions for screen-adaptive chroma rescaling depended only on luminance, and generated according to an embodiment of this invention.

Let n denote the dynamic range (DR) of the target display. As discussed earlier (see equation (8)), experiments have shown that in the receiver one can improve image quality—specifically the chroma saturation—by employing a saturation scaling function. In an embodiment, such a function is derived empirically using a set of training images. For example, the training sequences may include frames from multiple video sequence that include a variety of colors of interest (e.g., colors related to flesh tones, the sky, clouds, the see, grass, flowers, and the like). Thus, each picture in this test data set may be available in multiple dynamic ranges: the reference SDR DR (e.g., 100 nits), the reference HDR DR (e.g., 4,000 nits) and a number of possible target display dynamic ranges (DR=n). Without limitation, for each such HDR picture in the test database (denoted as $v_j$) one may compute an energy-ratio function, such as $$e^n(j,i) = \left( \frac{(\bar{s}_{ji}^{u,n} - 0.5)^2 + (\bar{s}_{ji}^{v,n} - 0.5)^2}{(v_{ji}^u - 0.5)^2 + (v_{ji}^v - 0.5)^2} \right)^{0.5}, \quad (24)$$

where $\bar{s}_{ji}^{u,n}$ and $\bar{s}_{ji}^{v,n}$ denotes the u and v color components of the reference SDR i-th pixel in the j-th picture corresponding to the original HDR $v_j$ picture, but color graded at n nits. As an example, FIG. 4A depicts a plot of ($\hat{s}_{ji}^{v,100}$, $e^n(j,i)$) values for one test picture at n=400 nits. From FIG. 4A, $e^n(j,i)$ values increase as a function of input luminance. Using computed ($\hat{s}_{ji}^{v,100}$, $e^n(j,i)$) values, one can generate a polynomial function that fits this data set according to an optimization method, say minimum least squares. The same process can be repeated for multiple values of n, e.g., for n=100, 200, 300, . . . , 1,000 nits. As an example, FIG. 4B depicts saturation scaling functions for n=100 nits (410), n=500 nits (420) and n=1,000 nits (430). For displays that have a dynamic range for which a pre-computed saturation scaling function is not available, one may simply interpolate between known scaling functions. For example, for a display with a dynamic range of 850 nits, one can generate a scaling function by interpolating between the neighbor scaling functions, say at 800 and 900 nits.

In some embodiments, instead of using equation (24), one may use alternative ways to measure the energy ratio between SDR and HDR values, such as $$e^n(j,i) = \left( \frac{|(\bar{s}_{ji}^{u,n} - 0.5)|}{|(v_{ji}^u - 0.5)|} \right) \text{ or} \quad (25)$$

$$e^n(j,i) = \left( \frac{2 \cdot (\bar{s}_{ji}^{u,n} - 0.5)^2}{(v_{ji}^u - 0.5)^2 + (v_{ji}^v - 0.5)^2} \right)^{0.5}.$$

In an embodiment, a saturation scaling functions may be approximated using a first-order or higher-order polynomial, for example, as in $$f^{u,n} = a_1^{4k\rightarrow n} \cdot \hat{s}_{ji}^{v,100}, \text{ or}$$

$$f^{u,n} = a_0^{4k\rightarrow n} + a_1^{4k\rightarrow n} \cdot \hat{s}_{ji}^{v,100} + a_2^{4k\rightarrow n} \cdot (\hat{s}_{ji}^{v,100})^2. \quad (26)$$

In another embodiment, for example, as expressed by equation (9), the saturation scaling function may be expressed as function of both luma and chroma. The derivation of such a function follows the same process as before. For example, for the u color component:

For each pixel (i) in a training image j generate points ($\hat{s}_{ji}^{v,100}$, $\hat{s}_{ji}^{u,100}$, $e^n(j,i)$)

Fit these points with a surface, say, using a least squares method

Using multiple such surfaces, from multiple test images, generate a scaling surface $f^{u,n}(\hat{s}_{ji}^{v,100}, \hat{s}_{ji}^{u,100})$ for a specific n value Approximate this surface with a polynomial (see equation (9)).

Figure 4C:
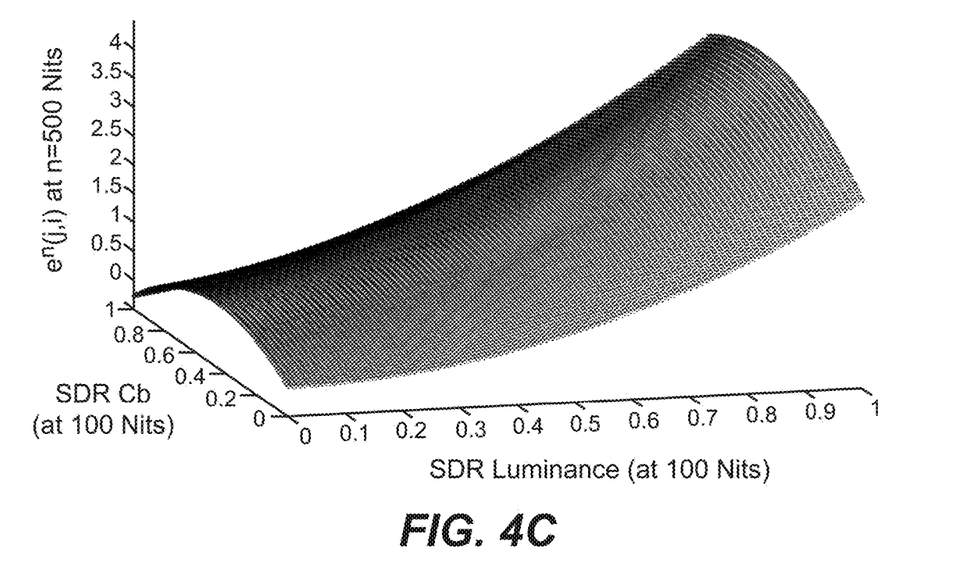
FIG. 4C depicts an example of a saturation scaling function for screen-adaptive chroma rescaling depended on both luminance and chroma, and generated according to an embodiment of this invention.

The same process then may be repeated for the second chroma component (v) to generate $f^{v,n}(\hat{s}_{ji}^{v,100}, \hat{s}_{ji}^{v,100})$, or to generate a saturation scaling function that depends on both chroma components. An example of a saturation scaling function that depends on the luma component and a single chroma component is depicted in FIG. 4C for n=500 nits. In an embodiment, all the saturation scaling functions may be designed "off-line", thus allowing a receiver with low computation resources to simply store a small set of MMR conversion matrices.

As mentioned before, it is possible that the dynamic range (DR) of a target display may not match any of the DR values for which an MMR conversion matrix has been precomputed. For example, let nt denote the DR of the target display (e.g., nt=450 nits) and let n2 and n3 denote the two nearest available target DR values bracketing nt (e.g., n2=400 nits and n3=500 nits). Let α and β denote interpolation factors, then $$\alpha = (n3 - nt)/(n3 - n2), \quad (27)$$

$$\beta = (nt - n2)/(n3 - n2).$$

Then, one can show that the conversion matrix and the corresponding updated MMR coefficients for DR=nt may be computed as:

$$T^{4000\rightarrow nt} = (\alpha \cdot T^{4000\rightarrow n2} + \beta \cdot T^{4000\rightarrow n3}), \quad (28)$$

$$m_j^{u,100\rightarrow nt} = T^{4000\rightarrow nt} * \begin{bmatrix} 1 \\ m_j^{u,100\rightarrow 4k} \end{bmatrix}. \quad (29)$$

Note that for our example (nt=450, n2=400, and n3=500), from equation (27), $\alpha=\beta=0.5$.

Figure 5:
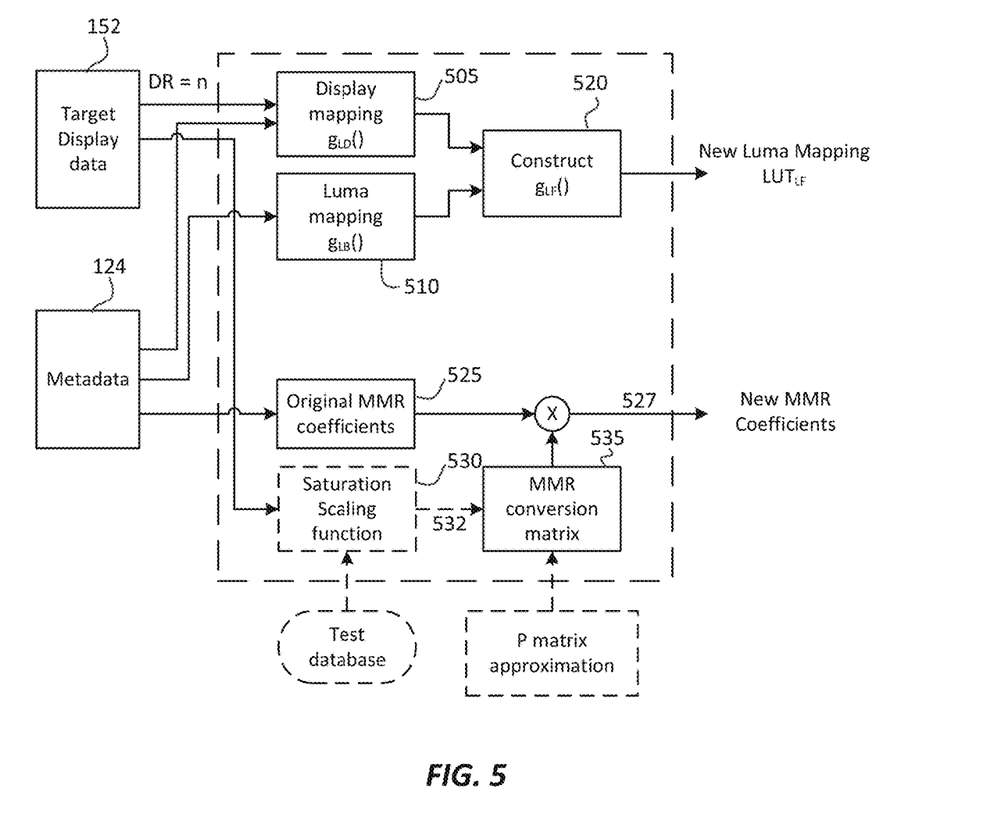
FIG. 5 depicts an example of screen-adaptive mapping for both the luma and the chroma components according to an embodiment of this invention.

FIG. 5 depicts an example of a screen-adaptive mapping for both luma and chroma components according to an embodiment. Given input video metadata (124) and the target display metadata (152), there are two separate processes: one for the luma component and one for the chroma components. For luma, given an original luma mapping function ($g_{LB}$( )) (510) and a display mapping function $g_{LD}$( ) (505), one constructs a new luma mapping function $g_{LF}$( )(520), according to equation (2). As described earlier, when there are limited computing resources, in an embodiment, $g_{LF}$( ) or its corresponding $LUT_{LF}$, may be constructed for a limited set of points (e.g., the pivot points of the $g_{LB}$ ( ) functions), and the remaining luminance mappings may be interpolated.

For chroma, given an original set of MMR prediction coefficients (525) (e.g., $m_j^{(u,v),100\rightarrow 4k}$), which are used to predict the output HDR chroma values based on the decoded SDR chroma values (e.g., see equation (7)), there is a two-step approach: a) (step 530) generate a saturation scaling function (532). The saturation scaling function is generated using a database of test images and fitting computed energy-ratio data (e.g., as computed by equation (24)) into either a 2D (scale vs luma) or 3D (scale vs luma and chroma) polynomial function. In a preferred embodiment, the test database includes SDR data ($\bar{s}_j''$) color-graded on the target dynamic range (n). b) Given the parameters of the saturation scaling function (532), in step 535, one can construct an MMR conversion matrix (e.g., $T^{4000\rightarrow n}$). Constructing this matrix requires a pseudo-inverse generated using sample SDR data. In an embodiment, the pseudo inverse may be precomputed iteratively based on a training set of images. Finally, the MMR conversion matrix is multiplied with the original MMR data to generate a new set of MMR coefficients (527), optimized for the target display (e.g., with DR=n).

Note that computing the saturation scaling functions (532) and incorporating them into the design of the MMR conversion matrices can be done off-line during a "training" phase. For example, given a device (say, a television set), with a display with dynamic backlight with dynamic range ranging between DR_low, and DR_high, one may use steps (532) and (535) to generate MMR conversion matrices (denoted as T(m)) for a range of M dynamic range values, say DR(m), m=1, 2, . . . , M, where DR_low≤DR(m)≤DR_high. These conversion matrices may be stored in the memory of the device. Given the input data, if the display's dynamic range matches one of the M precomputed values (e.g., DR(m), m=1, 2, . . . , M), then the corresponding T(m) table is used directly to compute the new MMR coefficients (527). Otherwise, the decoder may use equation (28) to interpolate the final MMR conversion matrix (535) using two of the precomputed conversion matrices.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to screen-adaptive decoding of HDR video, such as those described herein. The computer and/or IC may compute any of a variety of parameters or values that relate to the screen-adaptive decoding of HDR video processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to screen-adaptive decoding of HDR video as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient screen-adaptive decoding of HDR video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for screen-adaptive decoding with a processor, the method comprising:
   receiving in a decoder an input image comprising pixels in a first dynamic range, wherein each pixel comprises a luma component and one or more chroma components;
   receiving metadata associated with the input image, wherein the metadata comprise input parameters associated with an input luma prediction function and an input chroma prediction function, wherein the input luma and chroma prediction functions map pixel values from the first dynamic range to pixel values in a second dynamic range, wherein the second dynamic range is higher than the first dynamic range;

receiving a target dynamic range value for a target display;

accessing a luminance display mapping function, wherein the luminance display mapping function maps luminance pixel values in the second dynamic range to luminance pixel values in the target dynamic range;

generating an output luma prediction function based on the parameters of the input luma prediction function and the luminance display mapping function, wherein the output luma prediction function maps pixel values in a luma component from the first dynamic range to pixel values in the target dynamic range;

generating output parameters for an output chroma prediction function based on the target dynamic range and a parameter conversion matrix, wherein the output chroma prediction function maps pixel values in a chroma component from the first dynamic range to pixel values in the target dynamic range; and generating an output image in the target dynamic range based on the input image, the output luma prediction function and the output chroma prediction function, wherein the method is performed by one or more processors.

2. The method of claim 1, wherein generating the output luma prediction function comprises:

mapping two or more input sample luminance pixel values in the first dynamic range to first output sample luminance values in the second dynamic range using the input luma prediction function;

mapping the first output sample luminance values in the second dynamic range to second output sample luminance values in the target dynamic range using the luminance display mapping function; and mapping the two or more sample luminance pixel values in the first dynamic range to the second output sample luminance values in the target dynamic range.

3. The method of claim 2, further comprising:

for an input luminance pixel value in the first dynamic range between a first input sample luminance pixel value and a second input sample luminance pixel value, generating a corresponding output luminance pixel value in the target dynamic range by interpolating between the second output sample luminance values corresponding to the first input and the second input luminance pixel values.

4. The methods of claim 2, wherein the input luma prediction function comprises a piece-wise linear or non-linear function with function segments determined between pivot points, and the two or more input sample luminance pixel values correspond to the values of two or more of the pivot points.

5. The method of claim 1, wherein generating the output parameters for the output chroma prediction function for one of the chroma components comprises computing:

$$m_j^{u, firstDR \to targetDR} = T^{secondDR \to targetDR} \cdot \begin{bmatrix} 1 \\ m_j^{u, firstDR \to secondDR} \end{bmatrix},$$

where $m_j^{u, firstDR \to targetDR}$ denotes a vector representing the output parameters of the output chroma prediction function for input image j, mapping input chroma pixels of the u chroma component in the first dynamic range to output chroma pixels in the target dynamic range, $m_j^{u, firstDR \to secondDR}$ denotes a vector based on the input parameters of the input chroma prediction function, and $T^{secondDR \to targetDR}$ denotes the parameter conversion matrix.

6. The method of claim 5, wherein generating the parameter conversion matrix comprises computing:

$$T^{secondDR \to targetDR} = P \cdot A^{secondDR \to targetDR},$$

wherein $A^{secondDR \to targetDR}$ denotes a matrix computed based on the coefficients of a polynomial representing a saturation scaling function and P denotes a matrix computed based on pixel values of an image in the first dynamic range.

7. The method of claim 6, wherein computing the P matrix comprises computing $$P = ((P_j^u)^T P\ P_j^u)^{-1} \cdot ((P_j^u)^T Q\ P_j^u),$$

where $P_u^j$ and $Q_j^u$ denote matrices computed based on the input image and the input chroma prediction function.

8. The method of claim 6, wherein computing the P matrix comprises computing $$P_1 = \sum_j ((P_j^u)^T P_j^u),$$

$$P_2 = \sum_j ((P_j^u)^T Q_j^u),$$

$$P = P_1^{-1} \cdot P_2$$

where $P_j^u$ and $Q_j^u$ denote matrices computed based on pixel values of one or more images in a set of test images and the chroma prediction function.

9. The method of claim 6, wherein the saturation scaling function maps input luma and chroma pixel values to scaled chroma pixel values, and the mapping can be expressed as a polynomial comprising one or more saturation scaling function parameters.

10. The method of claim 9, wherein generating the saturation scaling function comprises:

accessing an energy-ratio function comprising a ratio of an energy metric in chroma pixel values in a reference image in the target dynamic range over the energy metric in the corresponding chroma pixel values in the reference image in the second dynamic range;

for two or more pixels in a first training reference image represented in the first, second, and the target dynamic range:

computing a first set of (s(i), e''(i)) values, wherein s(i) denotes the luminance value of pixel i in the first dynamic range and e''(i) denotes the corresponding energy metric for its chroma pixel values in the second and target (n) dynamic rates;

generating a first polynomial function that fits the first of (s(i), e''(i)) data according to an optimization criterion; and generating the saturation scaling function based on the first polynomial function.

11. The method of claim 10, further comprising:

generating a second set of (s(i), e''(i)) data generated based on a second training reference image;

generating a second polynomial function that fits the first and second sets of (s(i), e''(i)) data; and generating the saturation scaling function based on the second polynomial function.

12. The method of claim 10, wherein computing the energy-ratio function comprises computing:

$$e^n(i) = \left( \frac{(\bar{s}_{ji}^{u,n} - 0.5)^2 + (\bar{s}_{ji}^{v,n} - 0.5)^2}{(v_{ji}^u - 0.5)^2 + (v_{ji}^v - 0.5)^2} \right)^{0.5},$$

where for pixel i in an image j, with u and v chroma components, $\bar{s}_{ji}^{u,n}$ denotes the u chroma pixel value of the image in the target dynamic range (n), $\bar{s}_{ji}^{v,n}$ denotes the v chroma pixel value of the image in the target dynamic range, and $v_{ji}^u$ and $v_{ji}^v$ denote the corresponding u and v chroma pixel values in the image in the second dynamic range.

13. The method of claim 5, wherein computing a pixel value of a chroma component of the output image in the target dynamic range comprises computing:

$$\hat{v}_{ji}^{u,targetDR} = p_{ji}^{u,firstDR} m_j^{u,firstDR \to targetDR}$$

where u denotes the chroma component, $\hat{v}_{ji}^{u,targetDR}$ denotes the i-th pixel value of the u chroma component in the output image at the target dynamic range, and $p_{ji}^{u,firstDR}$ denotes a vector of pixel values generated based on the input pixel values in the first dynamic range.

14. The method of claim 5, wherein generating the parameter conversion matrix $T^{secondDR \to targetDR}$ for the target dynamic range (targetDR) comprises computing:

$$T^{secondDR \to targetDR} = (\alpha \cdot T^{secondDR \to DR(1)} + \beta \cdot T^{secondDR \to DR(2)}),$$

where $T^{secondDR \to DR(1)}$ denotes a pre-computed parameter conversion matrix for a dynamic range DR(1) lower than the target dynamic range, $T^{secondDR \to DR(2)}$ denotes a pre-computed parameter conversion matrix for a dynamic range DR(2) higher than the target dynamic range, and α and β are interpolation factors, wherein $$\alpha = (DR(2) - targetDR)/(DR(2) - DR(1)),$$

$$\beta = (targetDR - DR(1))/(DR(2) - DR(1)).$$

15. An apparatus comprising a processor and configured to perform the method recited in claim 1.

16. A non-transitory computer-readable storage medium having stored thereon computer-executable instruction for executing a method in accordance with claim 1.

* * * * *